United States Patent
Tikkanen et al.

(10) Patent No.: US 8,079,436 B2
(45) Date of Patent: Dec. 20, 2011

(54) VEHICLE WITH A DRIVE ENGINE FOR DRIVING A TRACTION DRIVE AND A WORKING HYDRAULIC SYSTEM

(75) Inventors: Seppo Tikkanen, Ulm (DE); Matthias Mueller, Neusaess (DE); Steffen Mutschler, Ulm (DE)

(73) Assignee: Bosch Rexroth AG, Stuttgart (DE)

( * ) Notice: Subject to any disclaimer, the term of this patent is extended or adjusted under 35 U.S.C. 154(b) by 343 days.

(21) Appl. No.: 12/158,195

(22) PCT Filed: Dec. 18, 2006

(86) PCT No.: PCT/EP2006/012198
§ 371 (c)(1),
(2), (4) Date: Jun. 19, 2008

(87) PCT Pub. No.: WO2007/071362
PCT Pub. Date: Jun. 28, 2007

(65) Prior Publication Data
US 2009/0008174 A1 Jan. 8, 2009

(30) Foreign Application Priority Data

Dec. 20, 2005 (DE) .................. 10 2005 060 998
Mar. 7, 2006 (DE) .................. 10 2006 010 508

(51) Int. Cl.
*B60K 6/00* (2007.10)
*B60K 17/00* (2006.01)
(52) U.S. Cl. ............................. 180/165; 60/413
(58) Field of Classification Search .................. 180/165, 180/69.6, 900, 305, 306, 307; 60/413–418
See application file for complete search history.

(56) References Cited

U.S. PATENT DOCUMENTS

| 3,700,060 | A | | 10/1972 | Keene et al. | |
|---|---|---|---|---|---|
| 3,910,043 | A | * | 10/1975 | Clerk | 60/413 |
| 4,098,144 | A | * | 7/1978 | Besel et al. | 74/661 |
| 4,242,922 | A | * | 1/1981 | Baudoin | 477/68 |
| 4,372,414 | A | * | 2/1983 | Anderson et al. | 180/165 |
| 4,382,484 | A | * | 5/1983 | Anderson et al. | 180/165 |
| 4,387,783 | A | * | 6/1983 | Carman | 180/165 |
| 4,441,573 | A | * | 4/1984 | Carman et al. | 180/165 |
| 4,891,941 | A | * | 1/1990 | Heintz | 60/416 |
| 5,794,734 | A | * | 8/1998 | Fahl et al. | 180/165 |
| 5,878,569 | A | * | 3/1999 | Satzler | 60/418 |
| 5,971,092 | A | * | 10/1999 | Walker | 180/308 |
| 6,358,174 | B1 | * | 3/2002 | Folsom et al. | 475/72 |
| 6,378,301 | B2 | * | 4/2002 | Endo et al. | 60/414 |
| 6,379,119 | B1 | * | 4/2002 | Truninger | 417/22 |
| 6,502,393 | B1 | * | 1/2003 | Stephenson et al. | 60/414 |

(Continued)

FOREIGN PATENT DOCUMENTS

DE 30 28 847 A1 3/1982
DE 32 35 825 A1 3/1984

(Continued)

*Primary Examiner* — Jeffrey J Restifo
*Assistant Examiner* — Jacob Meyer
(74) *Attorney, Agent, or Firm* — Scully, Scott, Murphy & Presser, P.C.

(57) ABSTRACT

The invention relates to a vehicle having a drive engine/motor (2) for driving a locomotive drive (6) and for operating at least one hydraulic working circuit (4). The vehicle has a hydraulic accumulator (11) which is connected to a hydraulic machine (12). The hydraulic machine (12) is connected to an output shaft (5) which connects the drive engine/motor (2) to the locomotive drive (6).

8 Claims, 3 Drawing Sheets

U.S. PATENT DOCUMENTS

| | | | |
|---|---|---|---|
| 6,655,136 B2* | 12/2003 | Holt et al. | 60/414 |
| 6,739,127 B2* | 5/2004 | Nippert et al. | 60/414 |
| 6,748,737 B2* | 6/2004 | Lafferty | 60/398 |
| 6,748,738 B2* | 6/2004 | Smith | 60/414 |
| 6,789,387 B2* | 9/2004 | Brinkman | 60/414 |
| 7,302,797 B2* | 12/2007 | Zhang et al. | 60/422 |
| 7,444,809 B2* | 11/2008 | Smith et al. | 60/414 |
| 7,856,816 B2* | 12/2010 | Duray | 60/414 |
| 2002/0060500 A1* | 5/2002 | Lafferty | 310/11 |
| 2006/0118346 A1* | 6/2006 | Rampen et al. | 180/165 |
| 2006/0266210 A1* | 11/2006 | Zhang et al. | 91/446 |
| 2007/0186548 A1* | 8/2007 | Smith et al. | 60/413 |
| 2008/0314664 A1* | 12/2008 | Mueller et al. | 180/165 |
| 2009/0008174 A1* | 1/2009 | Tikkanen et al. | 180/165 |
| 2010/0269496 A1* | 10/2010 | Mueller et al. | 60/325 |

FOREIGN PATENT DOCUMENTS

| | | |
|---|---|---|
| DE | 86 15 387.0 | 5/1991 |
| DE | 43 33 564 A1 | 4/1995 |
| DE | 699 02 939 T2 | 5/2000 |
| DE | 10 2005 060 990 A1 | 6/2007 |
| DE | 10 2006 006 583 A1 | 6/2007 |
| EP | 1 433 648 A2 | 6/2004 |
| WO | WO 88/03123 | 5/1988 |
| WO | WO 94/16770 | 8/1994 |

* cited by examiner

VEHICLE WITH A DRIVE ENGINE FOR DRIVING A TRACTION DRIVE AND A WORKING HYDRAULIC SYSTEM

BACKGROUND

The invention relates to a vehicle with a drive engine for driving a traction drive and for driving at least one working hydraulic system.

In the case of machines or utility vehicles, it is the norm that only one prime mover is provided, with which the different consumers of the vehicle are driven. In particular, it is usual to provide a single diesel engine. In the case of several different functions, for example a traction drive as well as an additional working hydraulic system, the power produced by the diesel engine is branched. A portion of the available overall power of the diesel combustion engine is allotted to the respective consumers in this case according to a defined control strategy. If short-term peak loads occur, this results for example in a reduction in the engine speed. Utility vehicles and construction machinery, such as fork lift trucks, wheel-type loaders or even refuse vehicles are frequently accelerated to low velocities and then braked to a stop again. At the same time or in the traction intervals occurring, work is carried out using the working hydraulic system. To be able to use the energy released in the braking process, it is known from DE 32 35 825 A1 to provide a device for storing energy.

On the vehicle known from DE 32 35 825 A1, a prime mover is connected to a drive axle via a characteristics converter. The power take-off shaft of the prime mover is coupled to an auxiliary drive, which is connected to a working hydraulic system via a clutch and an overrunning clutch. A hydromachine can be coupled to the working hydraulic system via a further clutch, this hydromachine being connected via a line to an accumulator. Due to this, when the corresponding clutches are closed, the hydromachine can convert the kinetic energy of the vehicle into storable pressure energy in over-running of the vehicle. If the accumulator is to be recharged without overrunning occurring, driving of the hydromachine indirectly via the auxiliary drive and the clutches is also possible.

In the case of the proposed vehicle, it is disadvantageous that the hydromachine has to be activated in a complex manner via a branching gearbox as well as at least one clutch. This not only increases the losses when storing energy, so that only a portion of the braking energy can be stored in the accumulator, but also increases the losses again when recovering the stored energy. At any rate, it is necessary to carry the working hydraulic system along also when recovering the energy, due to which considerable losses arise in spite of the working hydraulic system not being used. In an alternative execution, a coupling with the drive axle of the vehicle can be produced, bypassing the working device. However, an additional transfer gearbox is necessary in this case to achieve speed matching of the hydromachine.

SUMMARY

According to an exemplary aspect of the invention, there is provided a vehicle with a simple option for energy storage and for transferring the energy between at least one working hydraulic system and a traction drive.

The vehicle according to the exemplary aspect of the invention has a drive engine for driving a traction drive and for driving at least one working hydraulic system. Furthermore, the vehicle has a hydraulic accumulator, which is connected to a hydromachine. The hydromachine is connected to a power take-off shaft connecting the drive engine to the traction drive. The vehicle has the advantage that the coupling of the hydromachine to the traction drive takes place at the power take-off shaft of the engine, where the torque of the drive engine is also coupled into the traction drive. This has the advantage that the power flow is unchanged, regardless of whether the torque produced is present due to the stored energy or due to driving on the part of the drive engine. Furthermore, it is advantageous that the hydromachine for charging the accumulator is coupled directly to the traction drive. A complex rerouting of power via an auxiliary drive or a transfer gearbox can be omitted.

It is advantageous to connect the hydromachine for storage purposes to a low-pressure accumulator as well as to a high-pressure accumulator. Such a connection with a low-pressure accumulator and a high-pressure accumulator has the advantage that a minimum pressure can always be maintained even on the suction side of the hydromachine by the low-pressure accumulator. The occurrence of cavitation is thus prevented when drawing pressure medium in. The low-pressure accumulator and the high-pressure accumulator work together to produce a hydraulic cradle. Due to the maintenance of a minimum pressure on the suction side of the hydromachine, even hydromachines that are problematic when sucking pressure medium in from a pressure-free tank volume can be used.

According to an exemplary embodiment, the traction drive of the vehicle is formed as a hydrostatic gearbox. The formation of the traction drive as a hydrostatic gearbox has the advantage, in interaction with the storage of energy in an accumulator that can be filled via a hydromachine, that during a braking process a continuous change can take place in the gear ratio in the hydrostatic gearbox. Thus the braking force can be set individually on the one hand, while on the other hand the speed at which the hydromachine is operated can be adjusted. At an adjusted speed, the hydromachine for storing energy can be operated in a particularly preferred speed range, due to which the losses can be reduced in turn. A consequence of this is efficient storage of the braking energy released.

In this regard it is advantageous, furthermore, to form the hydromachine as an adjustable hydrostatic piston engine. By adjusting the absorption volume of the hydromachine during a braking process, the braking power can likewise be varied. It is advantageous to use a hydrostatic gearbox as a traction drive and in addition to execute the hydrostatic piston engine adjustably. With suitable control of the gear ratio of the hydrostatic gearbox and of the absorption volume of the hydromachine, particularly efficient usage of the available kinetic energy of the vehicle can thus be achieved.

Furthermore, it is advantageous to provide a working hydraulic system which comprises at least one hydropump operating in a closed circuit. When using a hydropump operating in a closed circuit, not only can the energy released by the traction drive on braking of the vehicle be used, but it is also possible to drive the hydromachine for storing energy by means of the working hydraulic system. If a double-acting lifting cylinder, for example, is connected to a hydropump in a closed circuit of the working hydraulic system, then the hydropump of the working hydraulic system can be driven when lowering a load. The hydropump, then acting as a hydromotor, then mechanically drives the hydromachine, which for its part conveys pressure medium to the accumulator. A regenerative utilization of energy both from the traction drive in the direction of the working hydraulic system and from the working hydraulic system in the direction of the traction drive is thus possible. The stored energy can also be re-used in the same circuit, thus the working hydraulic system or the traction drive.

It is also advantageous to execute the hydromachine disconnectably. In the arrangement according to the exemplary embodiments of the invention, the hydromachine is coupled to a drive shaft connecting the drive engine to the traction drive, such a disconnectable arrangement is especially advantageous. Thus when the accumulator is completely filled, for example, if carrying the hydromachine along were to result for example in churning losses, the hydromachine can be disconnected. Connection is always possible as required, if recovery of the energy is necessary. In the intervening period, in which a transport journey is carried out for example at constant velocity, the disconnected hydromachine does not cause any losses, on the other hand.

The exemplary embodiments of the vehicle according to the exemplary aspect of invention are illustrated in the drawing and are described in greater detail in the following description.

DETAILED DESCRIPTION OF EXEMPLARY EMBODIMENTS

Figure 1:
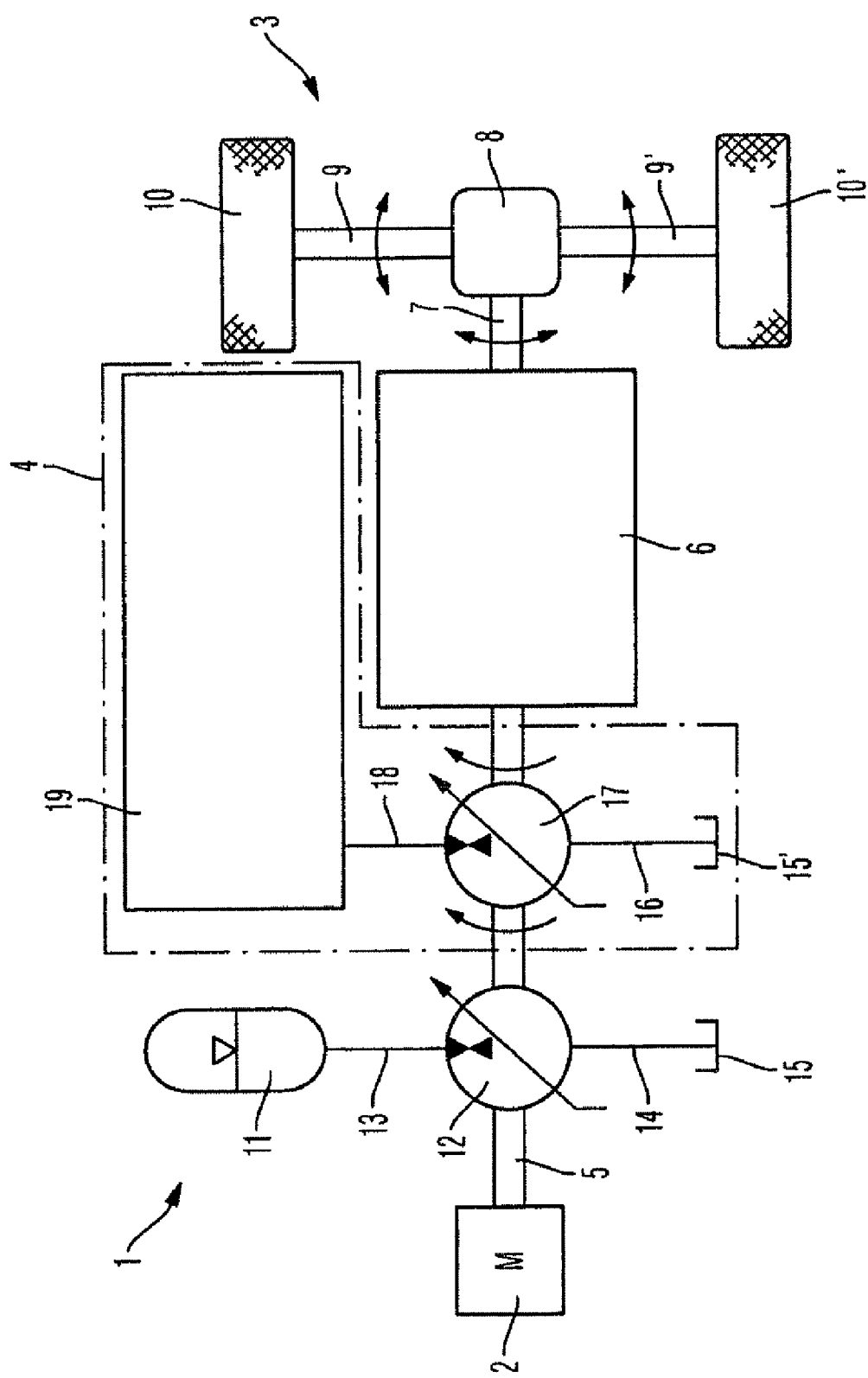
FIG. 1 shows a schematic representation to clarify the arrangement according to the invention.

In FIG. 1, the basic structural elements of a vehicle with a hydraulic working circuit and a traction drive are shown first of all. The vehicle 1 has a drive engine 2 used jointly by the elements to be driven. The drive engine 2 drives the vehicle by driving a drive axle 3. In order to be able to operate further working devices in addition to the driving tasks, the drive engine 2 is connected to a hydraulic working circuit 4.

The drive engine 2 transmits its output torque via a power take-off shaft 5 to a vehicle drive 6, which acts via a vehicle power take-off shaft 7 on a differential gearbox 8 of the drive axle 3. The differential gearbox 8 is connected to a first half-shaft 9 and a second half-shaft 9', which are connected to the driven vehicle wheels 10, 10'. The vehicle drive 6 can be executed in any way. In particular, it can be designed as a purely mechanical drive, so that the vehicle drive 6 preferably consists of a mechanical manual gearbox. In this case a decoupler is provided at the vehicle drive 6 on the input side. The traction drive 6 can likewise be executed as an automatic gearbox, which is connected via a hydrodynamic converter to the power take-off shaft 5. For the sake of simplicity, only one driven vehicle axle 3 is shown in FIG. 1. However, it is also possible that the traction drive 6 comprises a transfer case of an all-wheel drive.

In the embodiment shown, the hydraulic working circuit 4 is an open circuit. If the vehicle 1 is braked, overrunning occurs due to the mass inertia. Opposite to normal driving operation, the torque introduced at the vehicle wheels 10, 10' is continued via the half-shaft 9, 9', the differential gearbox 8 as well as the vehicle power take-off shaft 7 and the vehicle drive 6 as far as the power take-off shaft 5. On normal vehicles without an accumulator device, this torque led via the power take-off shaft 5 to the drive engine 2 is reinforced at the drive engine 2. In a drive with energy recovery, an accumulator 11 is provided for storing pressure energy, as shown in FIG. 1.

The accumulator 11 is equipped with a compressible volume, so that a pressure medium can be conveyed to the accumulator 11 under compression of the compressible volume. To facilitate the transport of pressure medium, a hydromachine 12 is provided, which is connected to the power take-off shaft 5. The hydromachine 12 transports pressure medium via an accumulator line 13 to the accumulator 11. The pressure medium is sucked from a tank volume 15 via a suction line 14. The hydromachine 12 is preferably executed adjustably. The adjustable hydrostatic piston engine is provided for transporting pressure medium in two directions and can be operated both as a pump and during recovery of the stored energy as a hydromotor. When recovering the stored energy, the pressure medium, which is under pressure, is supplied from the accumulator 11 via the accumulator line 13 to the hydromachine. The hydromachine 12 then acts as a hydromotor and by expansion of the pressure medium produces a torque, which is transferred from the hydromachine 12 to the power take-off shaft 5.

The torque transferred to the power take-off shaft 5 can be used in the same way as were possible if generated by the drive engine 2. This means that the torque produced by the energy recovery can be made available both to the vehicle drive 6 and to the hydraulic working circuit. The hydraulic working circuit 4 likewise comprises an adjustable hydropump 17. The adjustable hydropump 17 is likewise provided for transportation in both directions. The hydropump 17 sucks in pressure medium via a second suction line 16 from a further tank volume 15' and pumps this via a working line 18 to a working hydraulic system 19. In the embodiment shown, the hydraulic working circuit 4 is executed as an open circuit.

Figure 2:
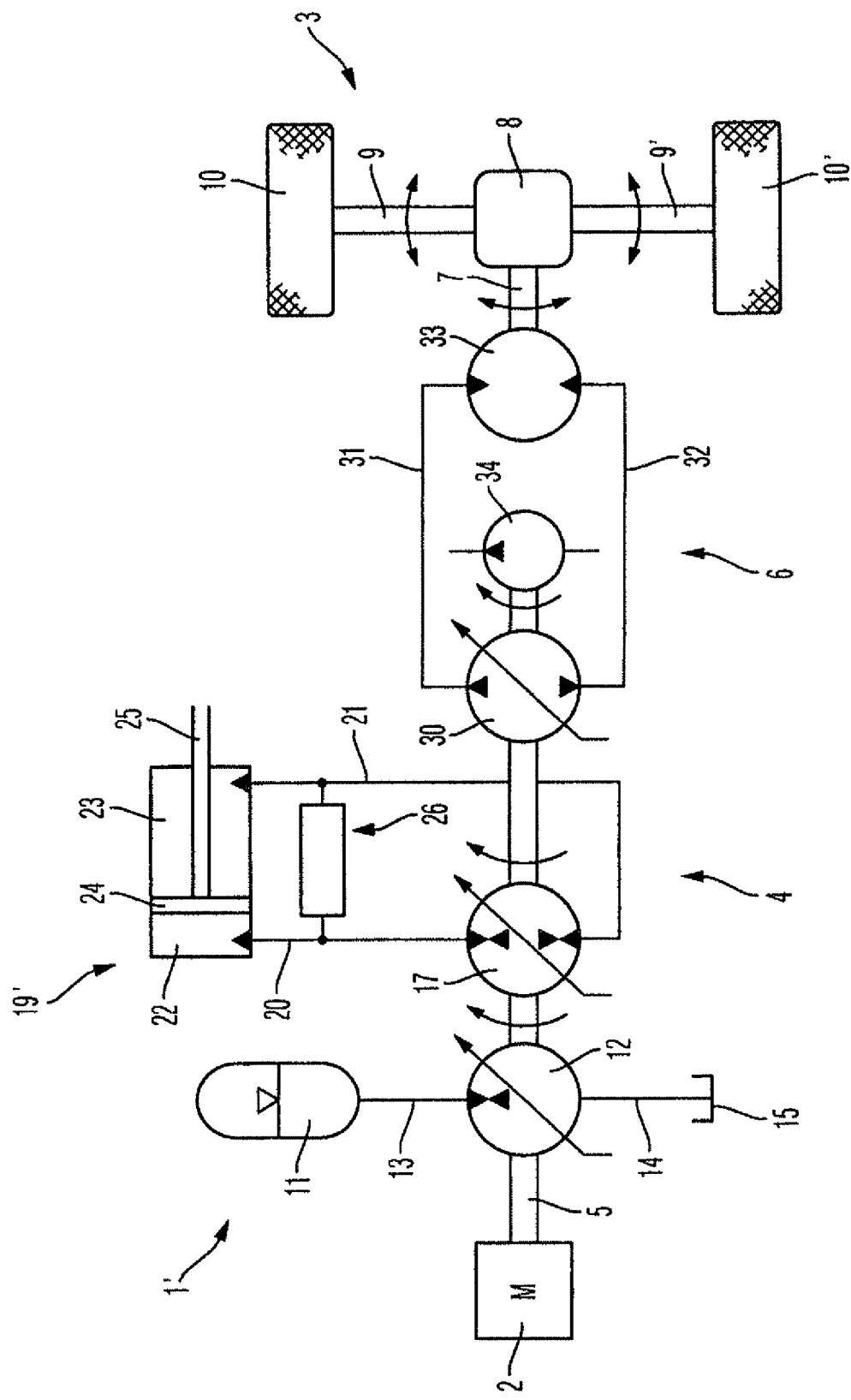
FIG. 2 shows a schematic representation of a first embodiment of a vehicle according to the invention.

In FIG. 2, a further embodiment of the vehicle according to the invention is shown. To avoid repetition, the features corresponding to FIG. 1 are not described afresh and are provided with the same reference signs in FIG. 2. In contrast to the hydraulic working circuit 4 in FIG. 1, the hydraulic working circuit 4 is executed as a closed circuit. The hydropump 17 is consequently connected to a first working line 20 and a second working line 21. The working lines 20 and 21 are connected to a double-acting hydraulic cylinder 19' and open there into a first pressure chamber 22 and a second pressure chamber 23. The first pressure chamber 22 and the second pressure chamber 23 are arranged in the hydraulic cylinder 19 on different sides of a piston 24. As a consequence of the pressure difference between the first pressure chamber 22 and the second pressure chamber 23, displacement of the piston 24 results. The piston movement of the piston 24 is transmitted via a piston rod 25 to an arm of an excavator, for example, or a lifting arm of a wheel-type loader. Due to the piston rod 25, there is a difference between the supplied and the displaced volume in the pressure chambers 22, 23. To equalize the differential volume, the first working line 20 and the second working line 21 are connected to one another via a valve manifold 26. The valve manifold 26 facilitates a volume flow required to equalize the difference. In the formation shown of a closed circuit, the hydraulic circuit 6 can also have a separate energy storage device in the form of a further hydroaccumulator.

The vehicle drive 6 is executed as a hydrostatic gearbox with a second embodiment of FIG. 2. The hydrostatic gearbox comprises a hydropump 30, which is adjustable and is provided for transportation in two directions. The hydrostatic pump 30 is coupled via a first gearbox line 31 and a second gearbox line 32 to a hydromotor 33. In the embodiment shown in FIG. 2, the hydromotor 33 is designed as a fixed displacement motor, through which a flow can pass in two directions. For further functions, such as e.g. the supply of pressure medium to the circuit of the traction drive 6, which circuit is initially pressureless following the start-up of the vehicle, a feed pump 34 is provided. Like the pump 30 and the hydrostatic piston engine 17 of the hydraulic working circuit 4, the feed pump 34 is connected to the power take-off shaft 5.

Figure 3:
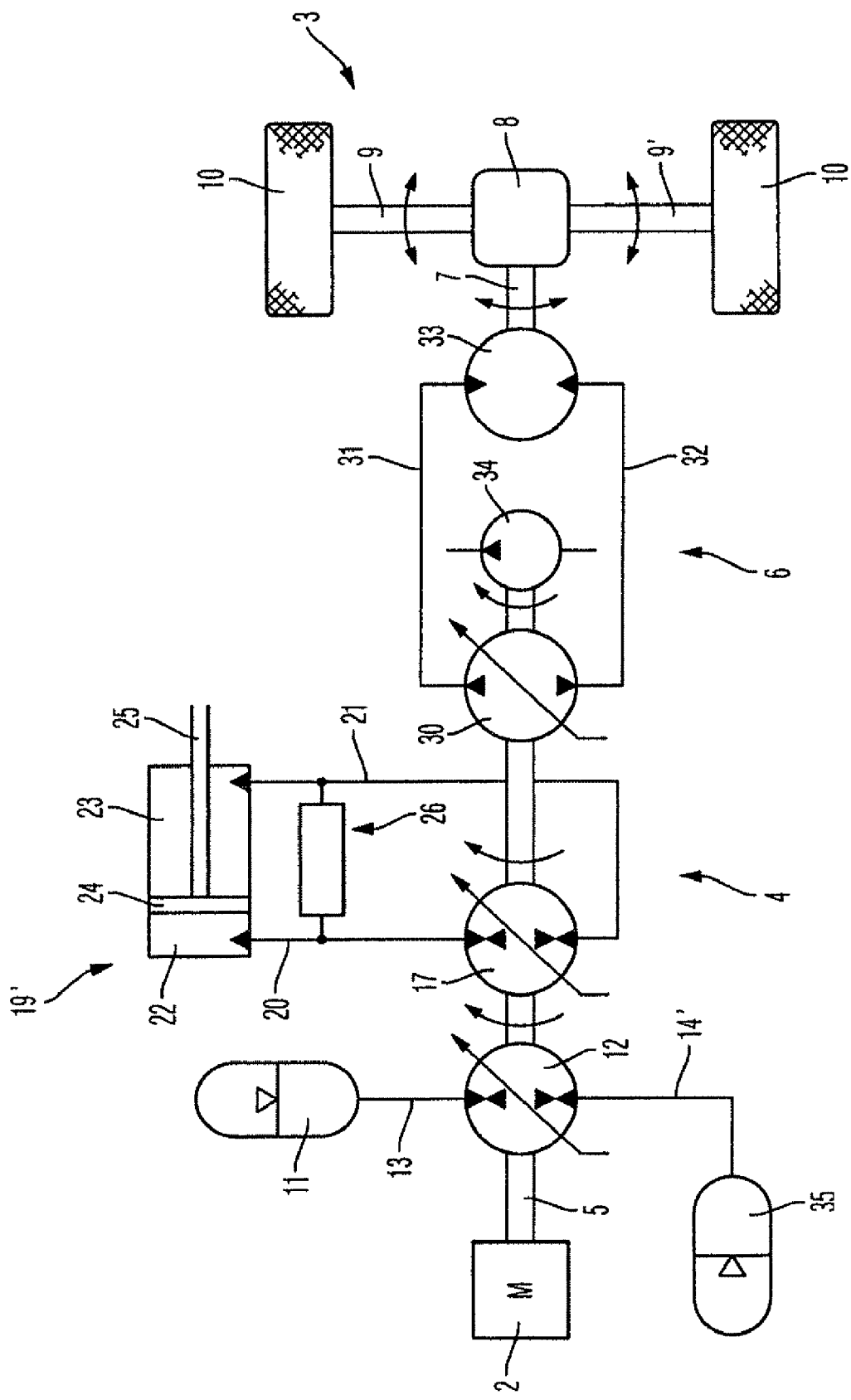
FIG. 3 shows a schematic representation of a second embodiment of a vehicle according to the invention.

A third embodiment is shown in FIG. 3. The traction drive 6 and the hydraulic working circuit 4 correspond to the embodiment in FIG. 2. In addition to the accumulator 11 formed as a high-pressure accumulator, which is provided for the storage of braking energy, a second accumulator 35 is provided in the embodiment in FIG. 3. The second accumulator 35 is connected to the suction line 141. During the storage of pressure energy in the accumulator 11, the hydromachine 12 accordingly no longer sucks pressure medium from a tank volume, which is normally pressureless, but from a second accumulator 35. The second accumulator 35 is designed as a low-pressure accumulator. In the second accumulator 35 designed as a low-pressure accumulator, a slight excess pressure prevails, so that even when drawing in a large volume flow, sufficient admission pressure exists in each case to avoid cavitation on the suction side of the hydromachine 12. This enables hydromachines to be used which are unsuitable for sucking pressure medium in independently from a pressureless tank volume due to their low suction capacity.

The embodiments described make it possible to store energy released both by braking of the vehicle 1 via the traction drive 6 and during the lowering of a load via the hydraulic circuit 4, for example, in the accumulator 11, which is designed as a high-pressure accumulator. The energy stored there can then be recovered via the hydromachine 12 operated in the reverse direction, which then acts as a motor. The torque produced by the hydromachine 12 is made available, like the torque of the prime mover 2, via the power take-off shaft 5. Due to the torque available at the power take-off shaft 5, the power flow direction both in the traction drive 6 and in the hydraulic circuit 4 is unchanged compared with production of the torque by the drive engine 2.

The invention is not limited to the embodiments shown. In particular, diverging combinations of individual features of the individual embodiments are conceivable.

The invention claimed is:

1. A vehicle comprising:
 a drive engine for driving a traction drive and at least one hydraulic working circuit;
 a hydraulic accumulator; and
 a hydromachine connected to the hydraulic accumulator,
 wherein the hydraulic working circuit comprises at least one hydropump; and
 wherein the drive engine is directly coupled to the hydromachine, the hydropump and the traction drive through a common power take-off shaft, such that torque is transmitted through said common power take-off shaft between the drive engine, the hydromachine, the hydropump and the traction drive.

2. The vehicle according to claim 1, wherein the hydromachine is connected to a low-pressure accumulator and a high-pressure accumulator.

3. The vehicle according to claim 1, wherein the traction drive comprises a hydrostatic gearbox.

4. The vehicle according to claim 1, wherein the hydromachine comprises an adjustable hydrostatic piston engine.

5. The vehicle according to claim 1, wherein the hydraulic working circuit comprises a working hydraulic system in an open circuit.

6. The vehicle according to claim 1, wherein the hydraulic working circuit comprises a working hydraulic system in a closed circuit.

7. The vehicle according to claim 1, wherein the hydromachine is disconnectable.

8. The vehicle according to claim 1, wherein the hydraulic working circuit comprises a separate energy accumulator device.

* * * * *